(12) United States Patent
Besbris et al.

(10) Patent No.: US 9,274,830 B2
(45) Date of Patent: Mar. 1, 2016

(54) SERVICE CLEAN-UP

(75) Inventors: David G. Besbris, Reston, VA (US);
Richard A. Doerksen, Irvine, CA (US);
John D. Robinson, South Riding, VA (US); Nancy W. Sumner, Oak Hill, VA (US)

(73) Assignee: AOL Inc., Dulles, VA (US)

(*) Notice: Subject to any disclaimer, the term of this patent is extended or adjusted under 35 U.S.C. 154(b) by 2119 days.

(21) Appl. No.: 11/281,887

(22) Filed: Nov. 18, 2005

(65) Prior Publication Data

US 2006/0168579 A1   Jul. 27, 2006

Related U.S. Application Data

(60) Provisional application No. 60/628,555, filed on Nov. 18, 2004.

(51) Int. Cl.
| | | |
|---|---|---|
| G06F 9/44 | (2006.01) | |
| G06F 9/48 | (2006.01) | |
| G06F 9/445 | (2006.01) | |
| G06F 9/46 | (2006.01) | |
| G06F 9/50 | (2006.01) | |
| G06F 9/54 | (2006.01) | |
| H04L 12/58 | (2006.01) | |
| H04L 29/08 | (2006.01) | |
| H04L 29/06 | (2006.01) | |

(52) U.S. Cl.
CPC *G06F 9/485* (2013.01); *G06F 8/65* (2013.01); *G06F 8/68* (2013.01); *G06F 9/445* (2013.01); *G06F 9/465* (2013.01); *G06F 9/5055* (2013.01); *G06F 9/541* (2013.01); *G06F 9/545* (2013.01); *H04L 12/58* (2013.01); *H04L 12/581* (2013.01); *H04L 51/04* (2013.01); *H04L 67/16* (2013.01); *H04L 69/24* (2013.01); *G06F 9/44536* (2013.01); *G06F 2209/462* (2013.01)

(58) Field of Classification Search
None
See application file for complete search history.

(56) References Cited

U.S. PATENT DOCUMENTS

| | | | |
|---|---|---|---|
| 5,862,325 A | | 1/1999 | Reed et al. |
| 5,890,176 A | | 3/1999 | Kish et al. |
| 5,915,112 A | * | 6/1999 | Boutcher ............. 719/330 |
| 5,974,428 A | | 10/1999 | Gerard et al. |
| 6,185,734 B1 | | 2/2001 | Saboff et al. |
| 6,317,746 B1 | | 11/2001 | Franklin, Jr. et al. |
| 6,377,960 B1 | * | 4/2002 | Qiu et al. |
| 6,594,700 B1 | | 7/2003 | Graham et al. |
| 6,658,659 B2 | | 12/2003 | Hiller et al. |
| 7,140,012 B2 | * | 11/2006 | Pugh et al. ............. 717/170 |
| 7,155,462 B1 | * | 12/2006 | Singh et al. ............ 717/170 |
| 7,188,163 B2 | * | 3/2007 | Srinivasan et al. ......... 709/221 |
| 7,210,124 B2 | * | 4/2007 | Chan ..................... 717/120 |
| 7,237,239 B1 | * | 6/2007 | Goel et al. .............. 717/170 |
| 7,539,985 B2 | * | 5/2009 | Marvin .................. 717/170 |
| 7,594,219 B2 | * | 9/2009 | Ramachandran et al. .... 717/124 |

(Continued)

OTHER PUBLICATIONS

"The Component Object Model Specification," Version 0.9, Oct. 24, 1995.

(Continued)

*Primary Examiner* — Jason Mitchell
(74) *Attorney, Agent, or Firm* — Finnegan, Henderson, Farabow, Garrett & Dunner, LLP

(57) ABSTRACT

Versions of a service not reachable by a set of service requestors that use the service are removed. Multiple, different versions of a service are stored, along with metadata associated with the multiple, different versions of the service. The metadata is examined to determine one or more of the multiple, different versions of the service that are not reachable by the set of service requestors that use the service. Those versions are deleted.

15 Claims, 14 Drawing Sheets

(56) References Cited

U.S. PATENT DOCUMENTS

| | | | |
|---|---|---|---|
| 2002/0029296 | A1 | 3/2002 | Anuff et al. |
| 2002/0133805 | A1 | 9/2002 | Pugh et al. |
| 2003/0140126 | A1 | 7/2003 | Budhiraja et al. |
| 2003/0167349 | A1 | 9/2003 | Krohn et al. |
| 2004/0031018 | A1 | 2/2004 | Marty |
| 2004/0103114 | A1 | 5/2004 | Sesma |
| 2004/0168153 | A1* | 8/2004 | Marvin .................. 717/120 |
| 2005/0022163 | A1 | 1/2005 | Brendle et al. |
| 2005/0091647 | A1 | 4/2005 | McCollum et al. |
| 2005/0097082 | A1 | 5/2005 | Yan |
| 2005/0165722 | A1* | 7/2005 | Cannon et al. .................. 707/1 |

OTHER PUBLICATIONS

"System Overview," *Inside Mac Os X*, Feb. 2001, Apple Computer, Inc. Feb. 2001, pp. 1-290.

Lee, Choonhwa et al. "Protocols for Service Discovery in Dynamic and Mobile Networks," International Journal of Computer Research, vol. 11, No. 1, pp. 1-2, ISSN 1535-6698, Nova Science Publishers, Inc., 2002.

Rubin, William et al., Introduction to DCOM, DevCentral—Introduction to DCOM, 2001 Interface Technologies, Inc., http://devcentral.iticentral.com/articles/DCOM/inro_DCOM/default.php, available at least as of Jul. 9, 2001 2.52.34 PM.

Williams, Sara et al., "The Component Object: A Technical Overview," http://msdn.microsoft.com/library/en-us/dncomg/html/msdn_comppr.asp?frame_true, Oct. 1994.

"Component Object Model (COM), DCOM, and Related Capabilities," http://www.sei.cmu.edu/str/descriptions/com_body.html, pp. 1-10, available at least as of Jan. 23, 2005 2:20pm.

Hodes et al., "An Architecture for Secure Wide-Area Service Discovery", Mar. 2002, Wireless Networks, vol. 8, Issue 2/3, pp. 213-230.

Waldo, "The Juni Architecture for Network-Centric Computing", Jul. 1999, Communications of the ACM, pp. 76-82.

* cited by examiner

- Prior Art -

- Prior Art -

```
<?xml version="1.0" encoding="UTF-8" ?>
                              702a        702b
<package version="1.4.6.1" service="boxelyRenderer">
  <modules>      706a       706b
    <module context="inProc" file="boxelyRenderer.dll">
      <class clsName="view"/>      708
      <class clsName="shell"/>     708
    </module>
  </modules>
  <clientFilter default="allowAll">
    <!-- block all versions of mailApp up to 1.1.4.18 inclusive. -->
    <override moniker="ee://aol/mailApp" to="1.1.4.18"/>
              714a                          714b
  </clientFilter>
</package>
```

FIG. 7

SERVICE CLEAN-UP

This application claims priority under 35 USC §119(e) to U.S. Provisional Patent Application Ser. No. 60/628,555, filed on Nov. 18, 2004, the entire contents of which is hereby incorporated by reference.

TECHNICAL FIELD

This disclosure relates to a software development platform.

BACKGROUND

Software development platforms generally provide a framework to assist developers in developing applications. Software development platforms may include a runtime environment that supports the execution programs designed for the environment and provides common capabilities to those programs, and a static library that provides the functions and application programming interfaces (APIs) for designing programs for the environment.

SUMMARY

In one aspect, versions of a service not reachable by a set of service requesters that use the service are removed. Multiple, different versions of a service are stored, along with metadata associated with the multiple, different versions of the service. The metadata is examined to determine one or more of the multiple, different versions of the service that are not reachable by the set of service requestors that use the service. Those versions are deleted.

Implementations may include one or more of the following features. For example, the metadata may include multiple metadata files. Each metadata file may be associated with one of the multiple, different versions of the service and contain metadata for the associated version of the service that indicates which ones of the set of service requesters are compatible with the associated version of the service.

To examine the metadata to determine one or more of the multiple, different versions of the service that are not reachable by the set of service requestors that use the service, the metadata may be examined to determine a version of the service that is compatible with all of the service requestors in the set of service requesters. The versions of the service that are set of service requestors may be designated as the one or more versions of the service that are not reachable by the set of service requestors that use the service. The designated versions then may be deleted.

The metadata files may be XML documents. In this case, the metadata may include one or more tags that indicate a default condition in which none of the service requestors in the set of service requestors are compatible with the associated version of the service; and one or more tags that override the default condition by indicating specific ones of the services requesters in the set of service requestors that are compatible with the associated version of the service. Alternatively or additionally, the metadata may include one or more tags that indicate a default condition in which all of the service requesters in the set of service requestors are compatible with the associated version of the service; and one or more tags that override the default condition by indicating specific ones of the service requestors in the set of service requestors that are not compatible with the associated version of the service.

The set of service requestors that use the service may include different versions of a service requestor that uses the service and the metadata that indicates which ones of the set of service requestors are compatible with the associated version of the service may include metadata indicating which ones of the different versions of the service requestor are compatible with the associated version of the service.

The service may be any one of: an instant messaging (IM) service; a mail service; a common local storage service; a notification manager; a preferences service; or a sequencer service.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIGS. 7 and 8 show examples of an implementation of manifest files expressed in XML.

DETAILED DESCRIPTION

Overview

Figure 1:
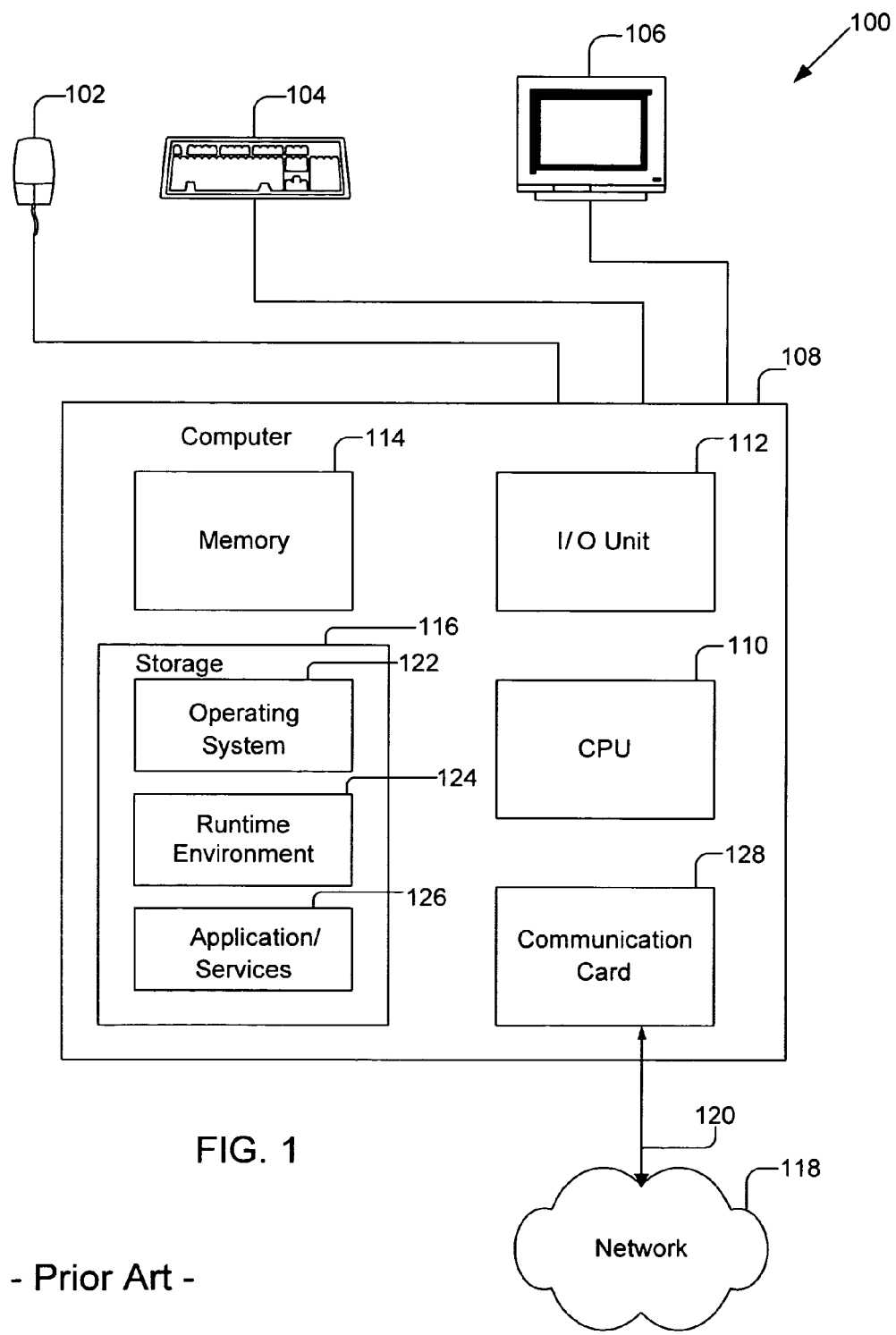
FIG. 1 shows exemplary components of a computing system.

FIG. 1 shows, exemplary components 100 of a computing system. The hardware setup may include various input/output (I/O) devices (e.g., mouse 102, keyboard 104, and display 106) and a central processing unit (CPU) 108. CPU 108 may include a processor 110, an I/O unit 112, memory 114, and storage 116. CPU 108 also may include some sort of communications card or device 116 (e.g., a modem or a network adapter) for exchanging data with a network 118 via a communications link 120 (e.g., a telephone line, a wireless network link, or a cable network). System 100 may be implemented, for example, as a personal computer, a workstation, a server, a cellular telephone, or a personal digital assistant.

Storage 116 stores data and various programs such as an operating system (OS) 122. The OS 122 is a program that controls the functioning and interaction of the hardware components of system 100 and facilitates the operation of other programs executing on system 100. Windows Me, Windows XP, Linux, and MacOS are examples of common operating systems for personal computers. Windows CE or Windows Embedded are examples of common embedded operating systems used in cellular telephones or personal digital assistants.

Storage 116 also stores a runtime environment 124 and one or more applications and/or services 126. The runtime environment 124 is a collection of code that controls the execution of programs specifically designed for it, such as applications or services 126, and provides common functions or capabilities to those programs.

In general, the runtime environment software resides between the programs designed for it and the OS 122. In other words, programs designed for the runtime environment 124 call routines of the runtime environment to perform input/output, graphical interface and other functions, and the runtime environment calls routines of the OS 122 to implement those functions. In contrast, programs that are not designed for the runtime environment 124 call directly upon routines of the OS 122 to perform input/output, graphical interface and other functions.

Figure 2:
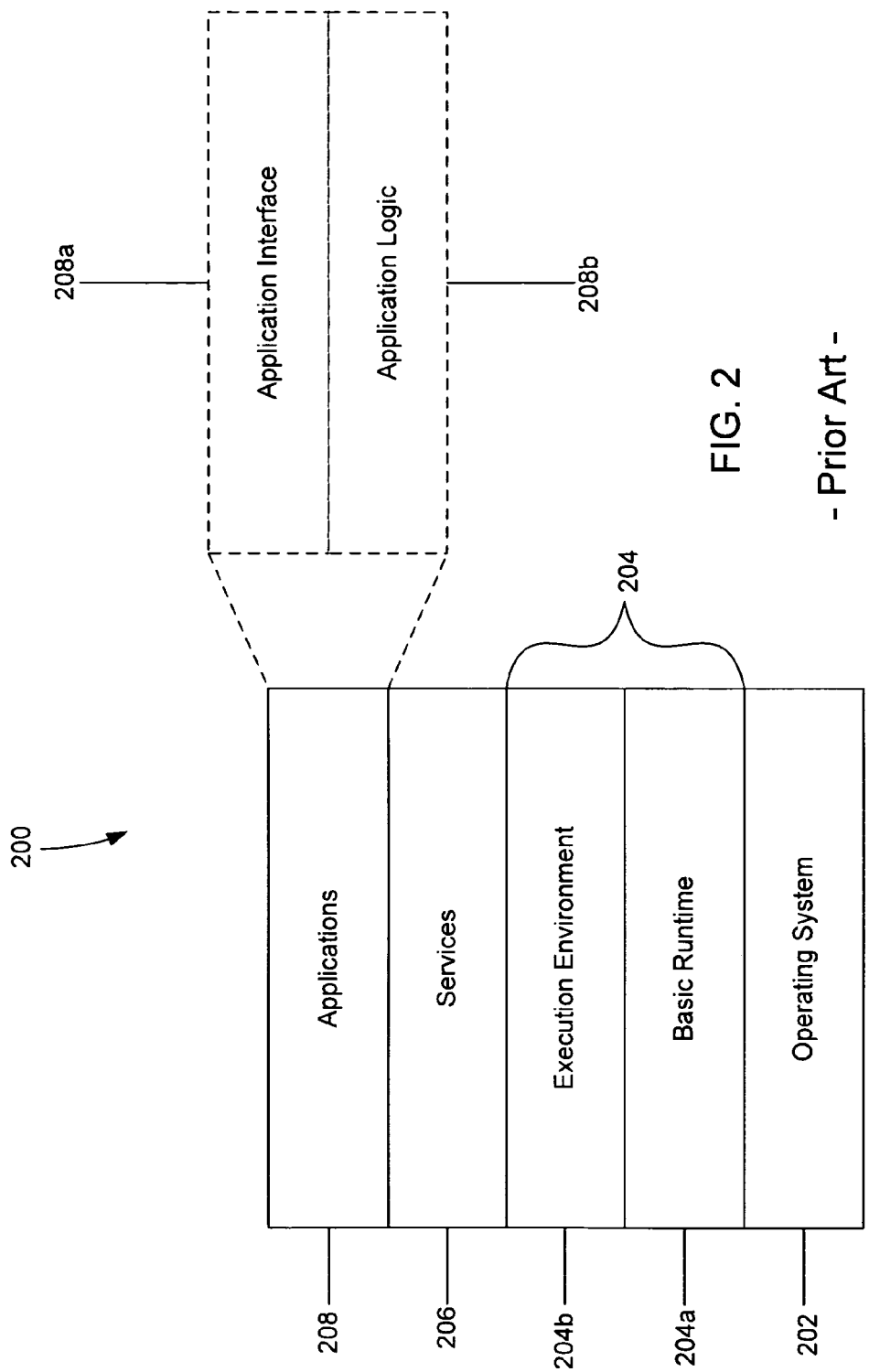
FIG. 2 illustrates a software model that includes an execution environment runtime.

Referring to FIG. 2, a software model 200 includes an operating system (OS) 202 and a runtime environment 204 layered on top of the OS 202. The runtime environment 204 includes a basic runtime 204a and an execution environment runtime 204b. The basic runtime 204a provides basic utilities that are used by the execution environment runtime 204b and are not otherwise provided for by OS 202. For example, the basic runtime 204a may provide a compression utility, an extensible markup language (XML) parsing utility, and a language runtime.

The execution environment runtime 204b is layered on top of the basic runtime 204a. The execution environment runtime 204b controls the execution of programs and services designed for the runtime environment 204, and provides common functionalities and capabilities for the execution of those programs and services. For example, runtime components of the execution environment 204 may provide for service versioning, service discovery, service clean-up, and service grouping, as described further below.

In general, services 206 and applications 208 run on top of the execution environment runtime 204b. A service is a collection of logically related code and functions to perform a particular task or set of related tasks. A service is generally used by an application or other service to accomplish the task or tasks, and usually does not interact with the end-user. When a service is used by an application or other service, at least a portion of the service's code and functions becomes part of the code of the application or other service, either by being loaded directly into the process containing the application or service, or by being loaded into another process and using an interprocess communications mechanism provided by the execution environment runtime 204b to handle the passing of calls to the service's code and functions and the results of those calls between the processes. In other words, the service's code is linked to the service requestor's code at runtime, and is executable by the requestor's code.

A service implements one or more classes of objects that provide the functionality of the service. An object is a piece of compiled code that provides functionality to other compiled code (e.g., an application or other service) on the system 100 (as opposed to a source code object). Thus, to access particular functionality of a service, another service or application makes a request to the execution environment runtime 204b for the appropriate object from the service. The execution environment runtime 204b then controls instantiating the service object, and connecting the requestor of the object to the object so that the requestor can access the service object's functionality. The functionality of an object is accessed by one or more methods of the object. For example, a mail service may have a mail object class that provides a SendMail method and a ReadMail method. The SendMail and ReadMail methods are used to send an e-mail and retrieve an e-mail, respectively.

Examples of services include:
an instant messaging (IM) service (which provides functionality related to instant messaging);
a mail service (which provides functionality related to e-mail);
a common local storage service (used by services or applications to access stored data);
a notification manager (which manages the dispatching of system-wide events to services or applications that are registered to receive them);
a preferences service (used by applications and other services to access a user's preferences); and
a sequencer service (which paces system-wide actions)

Applications 208 are the programs that provide a set of features to the end-user. For example, an e-mail program allows a user to view the e-mails in his or her mailbox, compose new e-mails, and send e-mails. An IM application allows a user to exchange instant messages with other users.

Applications 208 are generally divided into an application interface portion 208a and an application logic portion 208b. In general, the interface 208a allows the user to interact with the application, provides a view of data (e.g., e-mails or instant messages) to the user, and allow the user to provide input to the application. The application logic 208b implements particular functionality based on user inputs by implementing certain logic and accessing services 206, and updates the interface 208a based on changes to the data. For example, if a user selects a send button on a mail application, the application logic translates that input into a send operation by calling the appropriate functions of a mail service, and updates the user interface 208a to reflect a sent e-mail once the e-mail is sent.

Figure 3:
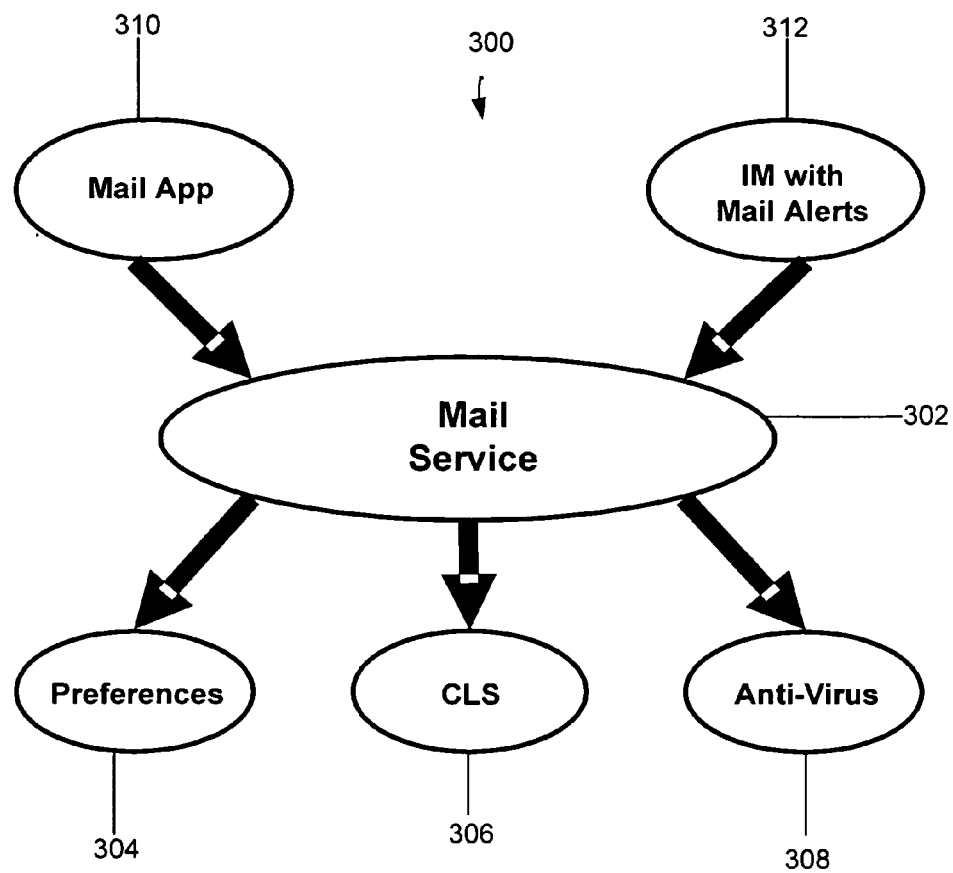
FIG. 3 illustrates an example of software that includes applications and services.

FIG. 3 illustrates an example of software 300 that includes applications and services designed for the execution environment runtime 204b. A mail service 302 provides functionality related to e-mail, such as sending and retrieving e-mail, checking for new e-mail, obtaining a list of new e-mails, and obtaining a list of read e-mails. Mail service 302 uses other services 304-308 to implement some of its functions. For example, mail service 302 uses the preferences service 304 to obtain user preferences related to e-mail, and uses the common local storage service 306 to access stored e-mails. Mail service also may use an anti-virus service to scan new e-mail for viruses.

A mail application 310 allows a user to view the e-mails in his or her mailbox, compose new e-mails, and send e-mails. To this end, mail application 310 uses the functionality provided by mail service 310 to send and receive e-mails, check for new e-mails, obtain a list of new e-mails, and/or obtain a list of read e-mails. An IM application 312 provides instant messaging capabilities to a user. To do so, the IM application 312 uses an IM service (not shown). In addition, the IM application 312 alerts a user when the user receives a new e-mail. To provide the user with such alerts, the IM application uses the mail service 302 to check for new e-mail and, if there is new e-mail, alerts the user.

Referring again to FIG. 2, the execution environment runtime 204b provides for the interoperability of the applications and services, and reuse of services. To provide for interoperability and reuse, the execution environment runtime 204b controls the instantiating of service objects and their connection them to service requestors. As part of this, the execution environment runtime 204b provides service versioning. In general, when an application or service wants to use a particular service object, the execution environment discovers the correct version and implementation of the service for the requesting application or service, instantiates the service object, and facilitates a connection between the application or service and the service object. This may allow for side-by-side versioning or services.

In addition, as part of instantiating service objects, the execution environment 204b provides for service grouping. When the execution environment runtime instantiates a service object, it instantiates the object in a particular process based on the metadata for the service. Thus, where the service is activated can be controlled by changing the metadata associated with the service. This may allow a developer to change between the service being loaded in-process and out-of-process, and may allow certain services or classes of objects to be grouped in a particular process by designating the process in the metadata.

Also, the execution environment runtime 204b may provide for other functionality, such as service clean-up, in which the execution environment runtime 204b discovers and removes versions of services that are no longer used by applications or other services. The execution environment runtime 204b also may provide for service discovery, in which the execution environment runtime 204b, at the request of an application or service, discovers services meeting particular criteria.

To develop applications and services for execution environment runtime 204b, a developer uses a library that provides an API for developing applications or services that run on top of the execution environment runtime 204b. The library is statically linked into applications and services, and provides a model object for objects running in the execution environment runtime 204b. The library APIs allow the developer to develop objects according to the object model, so that those objects are exposed to other applications and services running on the execution environment runtime 204b. The API also allows the developer to develop applications and services running on the execution environment runtime 204b that access the objects developed according to the object model. Also as described further below, in addition to being accessed by the API, objects developed using the API can be accessed as native objects (i.e., objects natively supported by the OS 202). Thus, the runtime environment 204 and the statically linked library provide for a software development platform that defines an object model, and provides for service versioning, service grouping, service clean-up, and service discovery. In addition, objects developed for the software development platform are accessible as native objects, and through the API of the platform.

Execution Environment Runtime

Runtime Architecture

The runtime components of the execution environment runtime 204b control the execution of applications and services. In general, one of the runtime components is a service manager subsystem that manages available services and applications, and facilitates the connection between services and consumers of the services, such as applications or other services. The service manager also may facilitate service versioning, service grouping, service discovery, and service clean-up.

With respect to service versioning, a service requester may request a service object from the service manager. The service manager then locates the service, determines the appropriate version of the service for the requestor, instantiates the service object from the located service, and returns a reference to the object to the requestor, which can then access the service object's functionality using the reference. To provide service grouping, the service manager reviews the metadata associated with the service when the service manager instantiates the service object to determine the process in which to instantiate the object.

In addition, with respect to service discovery, a service requestor may request that the service manager identify services that meet particular criteria. As described further below, services have meta-data associated with them that describes their properties and capabilities (in the form of a service manifest file), and other information about the service. The service manager may search the meta-data of the services to determine which ones meet the criteria requested by the requestor. The service manager then returns an identification of the service, and also may return the meta-data describing the criteria.

Also, to provide service clean-up, the service manager may review the meta-data to determine which versions of services are no longer used by other services or applications. The service manager then removes those versions of services that are no longer used.

Figure 4:
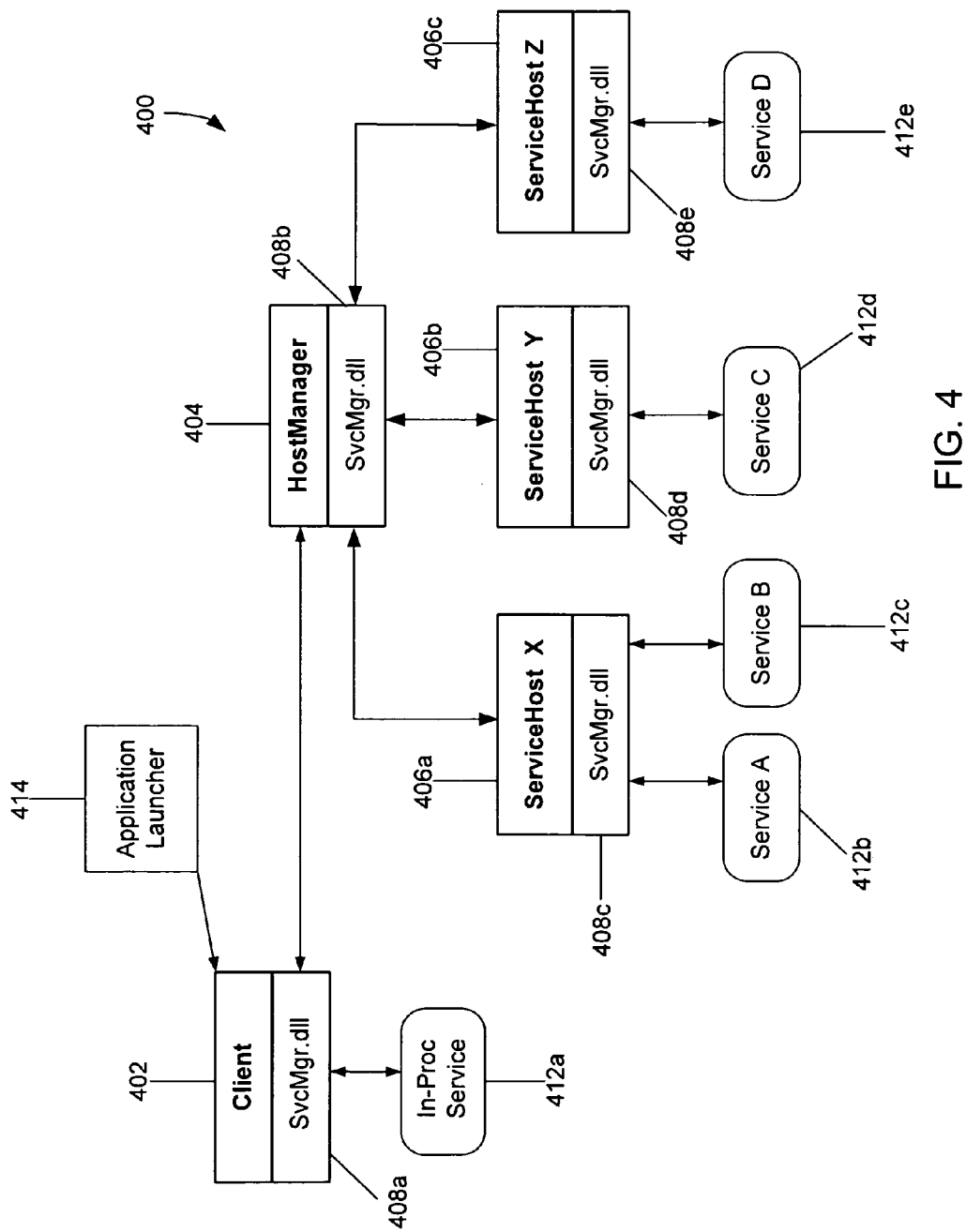
FIG. 4 is an example of a runtime architecture for the execution environment runtime.

FIG. 4 shows one implementation of a runtime architecture 400 for execution environment runtime 204b. Runtime architecture 400 includes a service requestor 402 (e.g., an application or service), which is also referred to as a client or consumer. Architecture 400 also includes a host manager processes 404, service host processes 406a-406c, services 412a-412e, and an application launcher process 414.

Also, in the implementation shown, the service manager subsystem is implemented as a dynamic link library (DLL), shown as SvcMgr.dll. The service manager DLL contains the code that implements a service manager object. Copies 408a-408e of the service manager DLL are loaded into the client 402, the host manager process 404, and the service host processes 406a-406c. These processes can then instantiate service manager objects, which enable locating services, instantiating service objects, and connecting service requestors to those objects, along with providing service versioning, service grouping, service clean-up and service discovery functions.

The service host processes 406a-406c host out-of-process service objects. In the implementation shown, services also are implemented as dynamic link libraries. Thus, in general, requested service objects need a host process in which to run. A requested service object may be loaded in-process with the client, such that it is hosted by the client process, or the service object may be loaded out-of-process. When a service object is loaded out-of-process, it is hosted by a service host process. For example, the service object from service 412a is loaded in-process with the client 402, while service objects from services 412b and 412c are loaded out-of-process in the service host process 406a. When a service object is an out-of-process object, the execution environment runtime 204b provides an interprocess communications mechanism to pass calls to the object, and results from the object, between the client process 402, and the service host process hosting the object, such as, for example, service host 406a.

The host manager process 404 controls the start-up and shutdown behavior of the service host processes 406a-406c, and, when a service object is loaded out-of-process, determines the appropriate service host process that will host the service object. The host manager 404 then instructs the service host to load the service's DLL into the service host, and instantiate the object, which the service host does using a service manager object instantiated from the service manager DLL loaded into the service host (e.g., service manager DLL 408c-408e). A reference to the object is then passed from the service host back to the client 402 through the host manager 404.

Also, through its service manager object 408b, the host manager process performs service versioning, service grouping, service discovery, and service clean-up. To perform such functions, the host manager process 404 reads and caches the service manifest files (described below) associated with each installed service.

Application launcher 414 starts the execution of client 402 when client 402 is an application that is designed like a service. Applications may be standalone executables that are designed to be executed in the execution environment runtime 204b, or applications may be designed like a service. To be designed like a service for runtime architecture 400, the application is implemented as a DLL, packaged in the manner described below, and includes a service manifest file as described below. Such applications are referred to as application services. Implementing an application like a service allows the application to be discovered and updated using the same execution environment mechanisms as are used to discover and update services. In general, the term service and refers to both a service and an application service.

The application launcher 414 is an executable application that receives an identifier (e.g., a moniker as described below) for the application as a command line parameter. To start the execution of the application service, the application launcher 414 executes a shim executable, loads the application service DLL into the shim executable, instantiates the application object from the DLL, and hands over the run loop to the application object.

Packaging of Services and Application Services

Services and application services designed for the execution environment runtime 204b have a particular on-disk structure (e.g., a particular directory structure) referred to as a "package." This package contains the code and resources used to implement the service or application service, and includes meta-data describing the service or application service. Packages may be stored in specific locations of the directory structure that contains the code for the execution environment runtime 204b.

Figure 5:
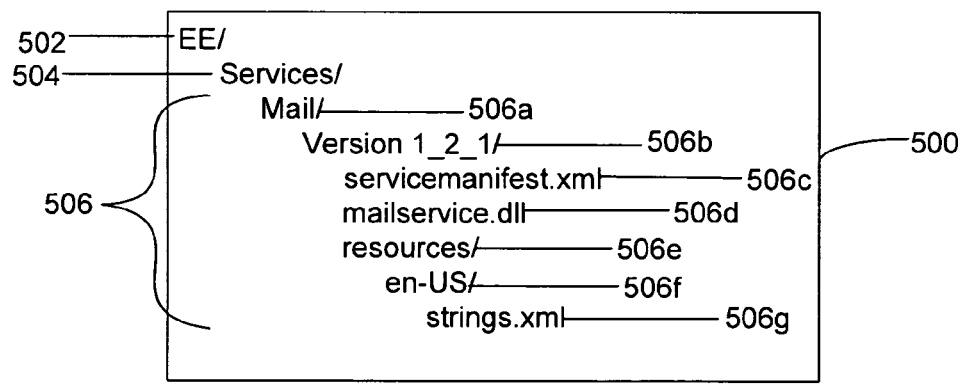
FIG. 5 is an illustration that shows an example of a directory structure containing a service package.

FIG. 5 shows an example of a directory structure 500 containing a service package. At the top level of the directory structure is the EE folder 502, which contains the code modules that implement the runtime 204a and execution environment runtime 204b. Also contained in the EE folder 502 is a Services folder 504. The Services folder 504 includes the packages of the various installed services and application services. In the example shown, a mail service package 506 is included in the Services folder 504.

Package 506 includes a top-level service folder 506a, and various sub-folders containing the code and resources of the service. The name of the top-level service folder 506a is the name of the service. In the top-level service folder 506a is a version folder 506b, which is named after the version number of the service, and contains the code and resources for that version of the service. Generally, the code and resources of a service or application service is the unit that is versioned, not just the code. While not shown, multiple, different versions of the service may be installed. In this case, each version is stored in its own version folder.

In the version folder 506b is a service manifest file 506c that is named "servicemanifest.xml." In general, a service manifest contains meta-data that richly describes the service. Service manifest files are discussed in more detail below.

Also in the version folder 506b is at least one service code module 506d that contains the code for the service. In the example shown, the code module is "mailservice.dll." The code modules generally may be implemented as dynamic link libraries, as shown.

The version folder 506b also contains a resources folder 506e. Resources folder 506e contains resources, which are generally non-code items used by the service. For example, resources folder contains a region folder 506f, which contains resources used by the service for a particular locale. In this case, region folder 506f is for a United States locale, and contains a "strings.xml" file 506g, which contains strings in English that are returned by the service for display to the user.

Figure 6:
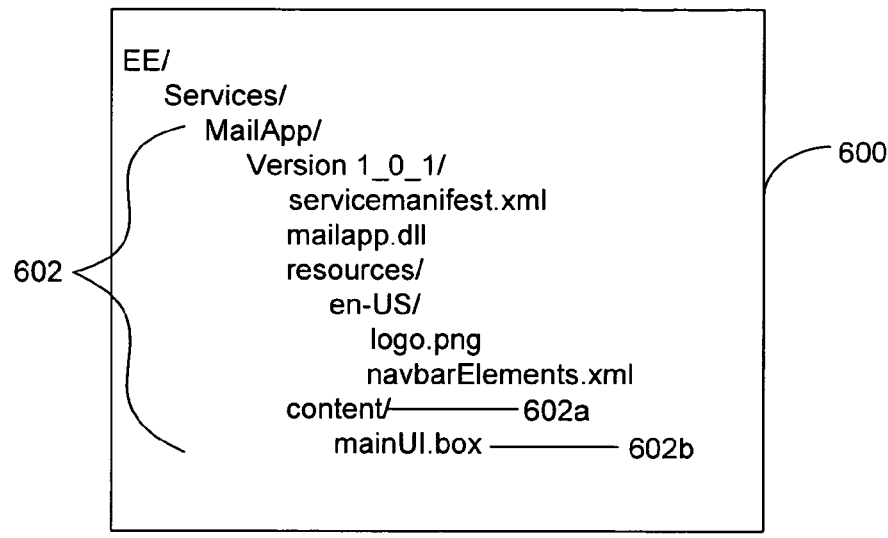
FIG. 6 is an illustration that shows an example of a directory structure containing a application service package.

FIG. 6 shows an example of a directory structure 600 containing an application service package 602. Directory structure 600 is similar to structure 500, except that application service package 602 contains a content folder 602a that contains one or more user interface definition files 602b. User interface definition files 602b may contain mark-up language (e.g., extended mark-up language (XML)) definitions of the user interface for the application service. User interface definition files 602b may be used by a rendering service to generate the appropriate user interface for the application service. While the example of FIG. 6 depicts an application service that uses user interface definition files 602b and a rendering service to generate the user interface for the application, some application services may implement the user interface in the code module of the application service.

Service Monikers

In execution environment runtime 204b, services (including application services), clients, and service objects may be identified by monikers. Thus, there generally may be three types of monikers: (1) a service moniker; (2) a client moniker; and (3) a class moniker.

A service moniker identifies a service or application service, and does not specify a specific version number of the service. A service moniker may have a form such as ee://<servicename>, where the <servicename> is the name of the service, and matches the name of the services folder for the service (e.g., folder 506a) and the name in the service attribute of the <package> tag in the service manifest for the service (described further below). The following is an example of a moniker for a mail service with a service name of "mail": ee://mail.

A client moniker is used to identify a client to the service manager subsystem so that the service manager subsystem can make decisions based on that identity. A client moniker may have a form such as ee://<client name>:<version number>, where <client name> is the name of the client and <version number> is the version of the client. The following is an example of a moniker for version 1.0.1 of a mail application with a client name of "mailapp" ee://mailapp:1.0.1.

A class moniker identifies a specific class of object exported by the specified service. A class moniker may have a form such as ee://<servicename>/<class>, where the <servicename> is the name of the service, and matches the name of the services folder for the service and the name in the service attribute of the <package> tag in the service manifest for the service (described further below), and the <class> is the specific class of object that can be exported from the service. For example, for an inbox class in a mail service, the class monitor may look like: ee://mail/inbox.

Service Manifests

Services and application services designed for the execution environment runtime 204b have a service manifest file associated with them. As described above, the service manifest file contains meta-data that richly describes the service or application service. A portion of the service manifest file is used to describe the code modules that comprise the service as well as the classes that those modules export. The service manifest file also can describe the properties and capabilities of the service, and provide any other static information that describes the service to potential consumers (e.g., other services or applications) of the service.

In one implementation, service manifest files are expressed in XML, and may have a number of XML tags that describe the code modules and exportable classes, as well as the capabilities of the service, and other static information of use to potential consumers of the service or application service. In general, the host manager process 404 reads the service manifest files of the installed services and application services, and caches the document object model (DOM) of the service manifest files. The host manager process 404, through the service manager object 408b, uses the cached DOMs to control the start-up and shutdown of services, and to provide service versioning, service grouping, service discovery, and service clean-up.

Figure 8:
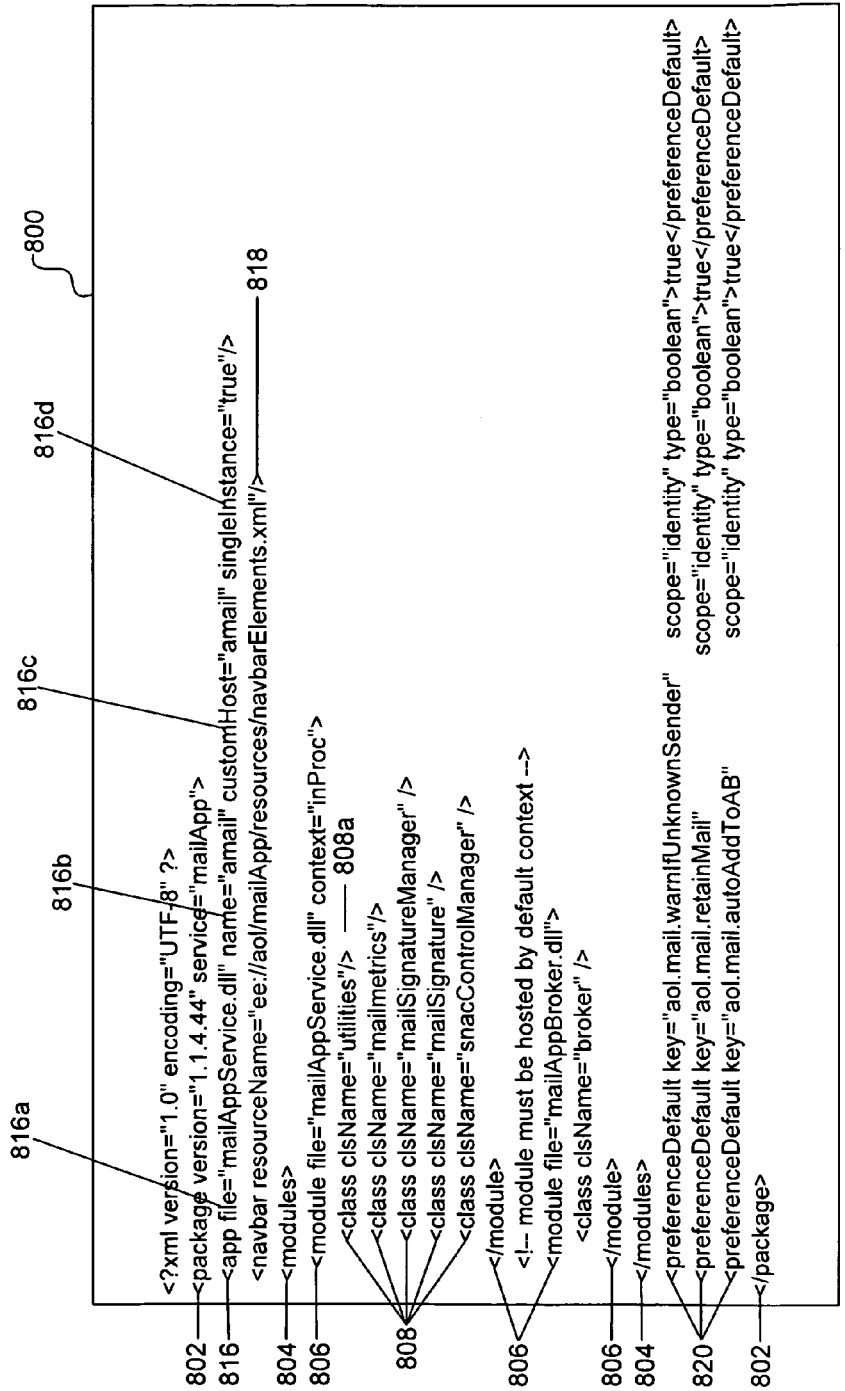

FIGS. 7 and 8 show examples of one implementation of manifest files in which the manifest files are expressed in XML. FIG. 7 shows a manifest file 700 for a rendering service, while FIG. 8 shows a manifest file 800 for a mail application implemented as a service.

The following are the basic tags that are used in service manifest files in the implementation shown: (1) a <package> tag; (2) an <app> tag; (3) a <modules> tag; (4) a <module> tag; (5) a <class> tag; and (6) a <clientFilter> tag.

The <package> tag (labeled 702 in FIG. 7 and 802 in FIG. 8) is the root element of the manifest file. The <package> tag contains two attributes—a version attribute and a service attribute. The value of the service attribute is set to the service's or application service's name, and matches the <servicename> portion of the service moniker, as well as the service folder in which the service is stored. The value of the version attribute is set to the version number of the particular instance of the service or application service with which the service manifest file is associated (by virtue of being stored in the package), and matches the name of the version folder.

Referring to FIG. 7, for example, the <package> tag 702 in manifest file 700 (FIG. 7) has a version attribute 702a with a value of "1.4.6.1" and a service attribute 702b with a value of "boxelyRenderer."

The <app> tag (labeled 816 in FIG. 8) is used in the manifest file of application services. A file attribute of the <app> tag has a value set to the file name of the code module that contains the code for the application service. The app tag also has a name attribute. The value of the name attribute represents the class of the application object. A customHost attribute designates the name of the executable shim that is launched and into which the code module is loaded. A singleInstance attribute may be specified with a value of "true" to indicate that the application service can only have one instance running at a time.

Referring to FIG. 8, as an example, the <app> tag 816 contains a file attribute 816a with a value of "mailAppService.dll," a name attribute 816b with a value of "amail," a customhost attribute 816c with a value of "amail," and a singleInstance attribute 816d with a value of "true." Thus, to execute the application service associated with manifest file 800, the application launcher 414 reviews manifest file 800 to determine that the customHost attribuite 816c has a value of "amail" and locates the executable shim with the name amail.exe. The application launcher 414 executes the shim, causes the mailAppService.dll code to be loaded into the shim process, and causes an object of the class amail to be instantiated to control the application.

The <modules> tag (labeled 704 in FIG. 7, and 804 in FIG. 8) has no attributes. It is used as a container for one or more <module> tags (labeled 706 in FIG. 7, and 806 in FIG. 8) that define the code modules and corresponding classes for the service or application service. Each <module> tag corresponds to a code module, and there may be multiple <module> tags within a <modules> tag. The code module associated with a <module> tag is designated by the file attribute of the <module> tag.

The <module> tag also contains a context attribute that defines whether the service object is loaded in-process or out-of-process. The value of the context attribute specifies where the code from the corresponding module is to be loaded: (1) in-process or (2) out-of-process in a service host. If the value of the context attribute is assigned "inProc," then the code is loaded into the process that is asking for it. If the context attribute is not specified, or has a value other than "inProc," then the code is loaded out-of-process.

If the context attribute is not specified, or is set to "defaultGrp," then the service is loaded out-of-process into a service host process with the default name (e.g., servicehost.exe). If the value of the attribute is set to another string besides "inProc" or "defaultGrp," then the code is loaded out-of-process into a service host process having a process group name equal to the string (e.g., mystuffexe).

Referring to FIG. 7, as an example, the <module> tag 706 has a context attribute 706a with a value of "inProc," and a file attribute 706b with a value of "boxelyRenderer.dll." Thus, the code from the boxelyRenderer.dll file will be loaded in-process with any requestors that request the rendering service.

One or more <class> tags (labeled as 708 in FIG. 7, and 808 in FIG. 8) are contained in a <module> tag and are used to designate the classes of objects that are exportable from the code module corresponding to the <module> tag. The <class> tag contains a clsName attribute. The value assigned to the clsName designates the name of an exportable object class. As an example, the first <class> tag 808 in manifest file 800 has a clsName attribute 808a with a value of "utilities."

The <clientFilter> tag (labeled as 712 in FIG. 7) in the manifest file offers a way of controlling which clients and specific versions of clients can access the modules contained in the package. Inside of the <clientFilter> tag is one or more <override> tags (labeled 714 in FIG. 7) that specify clients to block or allow.

The <clientFilter> tag has an optional default attribute that specifies a default type of filter. The default atttibute may take one of two values: either "allowAll" or "revokeAll." If the default attribute is not present, its value is assumed to be "allowAll." If the default attribute has a value of "allowAll," then the override tags specify clients and versions of clients to be blocked. If the default attribute is "revokeAll" then the override tags specify the only clients and versions of clients that have permission to use this package.

Each <override> tag contains a moniker attribute that has a value set to a client moniker, but excludes the version (e.g., ee://clientName). The override tag may contain a from attribute and a to attribute, which specify a range of versions, or a version attribute that designates a single version to be affected by the override tag. If the version string in the "to" or "from" attribute is preceded by the "~" character (e.g. "1.7"), then the "to" or "from" attributed is non-inclusive. If the version string is not preceded by the "~" character, then the from attribute and to attribute are considered to be inclusive. If the to attribute is present, but not a from attribute, all versions through the to attribute will be affected. Similarly, if a from attribute is present, but not a to attribute, all versions after the from attribute will be governed by the override tag.

Referring to FIG. 7, as an example, the <clientFilter> tag 712 in manifest file 700 has a default attribute with a value of "allowAll." The <override> tag 714 in manifest file 700 has a moniker attribute 714a with a value of "ee://mailApp" and a to attribute 714b with a value of "1.1.4.18." Thus, all versions of the client corresponding to "mailApp" up to and including version 1.1.4.18 are blocked from using the rendering service corresponding to manifest file 700.

Service manifests also may have other tags that describe properties or capabilities of the service. For example, referring to FIG. 8, a <navbar> tag 818 indicates that the mail application has a navigation bar element that can be loaded by a navigation bar application to provide a button on the navigation bar application that can be selected by a user to launch the mail application. Also, <preferenceDefault> tags indicate default preferences for the mail application.

Service Versioning and Service Grouping

The execution environment runtime 204b, through the service manager subsystem, may provide for service versioning. In general, a client requests a service object using the class moniker for the corresponding class. By examining the service manifest files, the service manager subsystem determines the correct version of the service for the client (i.e., the newest version that the client is permitted to use), and the code module of the correct version that contains the class. The service manager subsystem then instantiates the service object and returns a reference to the service object to the client. This may allow different versions of the same service to exist side-by-side, with the most recent version that is compatible with a client being used by the client.

In addition, the execution environment may provide for service grouping. In general, when the service manager subsystem instantiates a service object, the service manager subsystem examines the service manifest file for the corresponding service to determine whether the code module is to be loaded in-process or out-of-process, and, if out-of-process, which service host the code should be loaded into. The service manager subsystem then loads the code into the appropriate service host and instantiates the service object in the service host. Thus, services can be grouped in specific service hosts, depending on the information in the service manifest. This may allow a developer to quickly and easily change whether a service runs in-process or out-of-process by simply changing the context attribute in the service manifest (as opposed to changing it in the source code and recompiling). This also may allow a developer to easily run certain services together as a group in the same service host process.

Figure 9A:
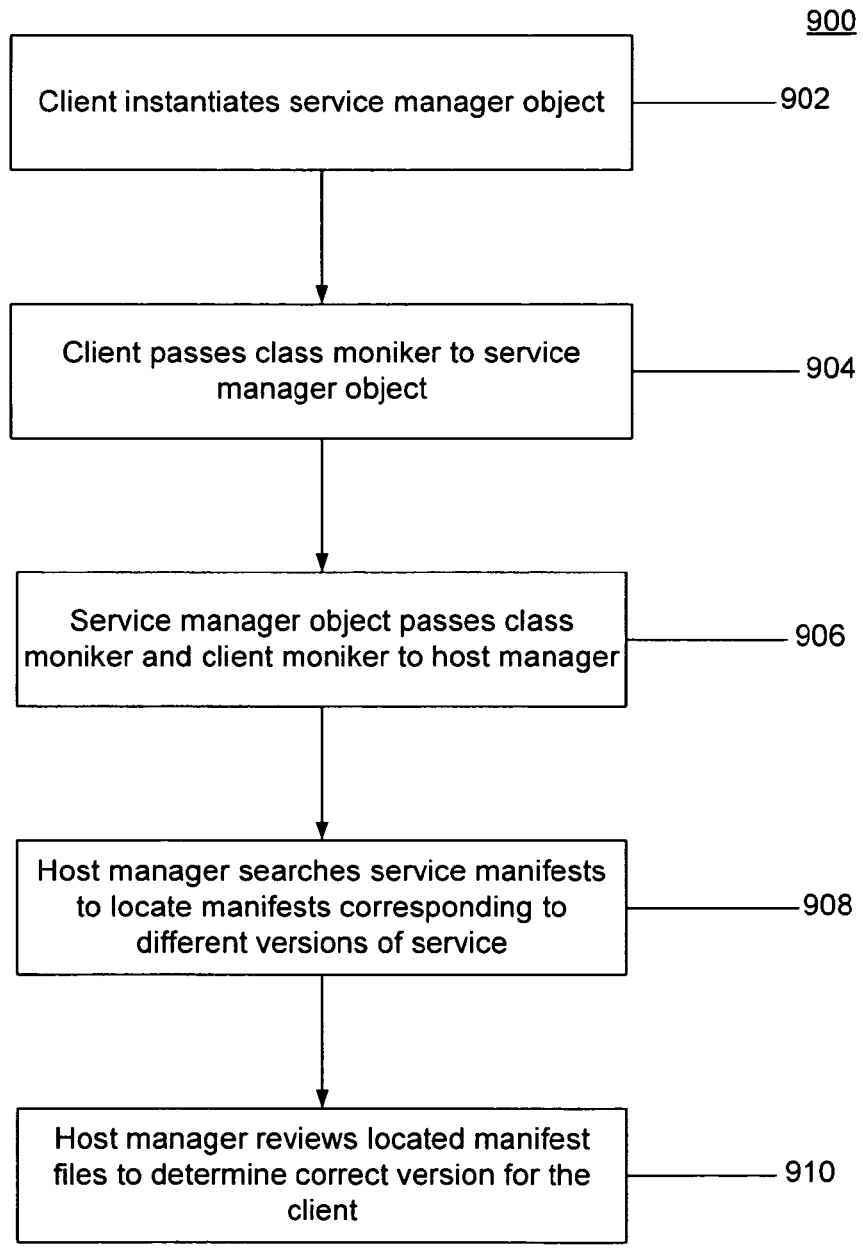
FIGS. 9A-9C are flowcharts showing an example of a process implemented by the runtime architecture of FIG. 4 for service versioning and grouping.
Figure 9B:
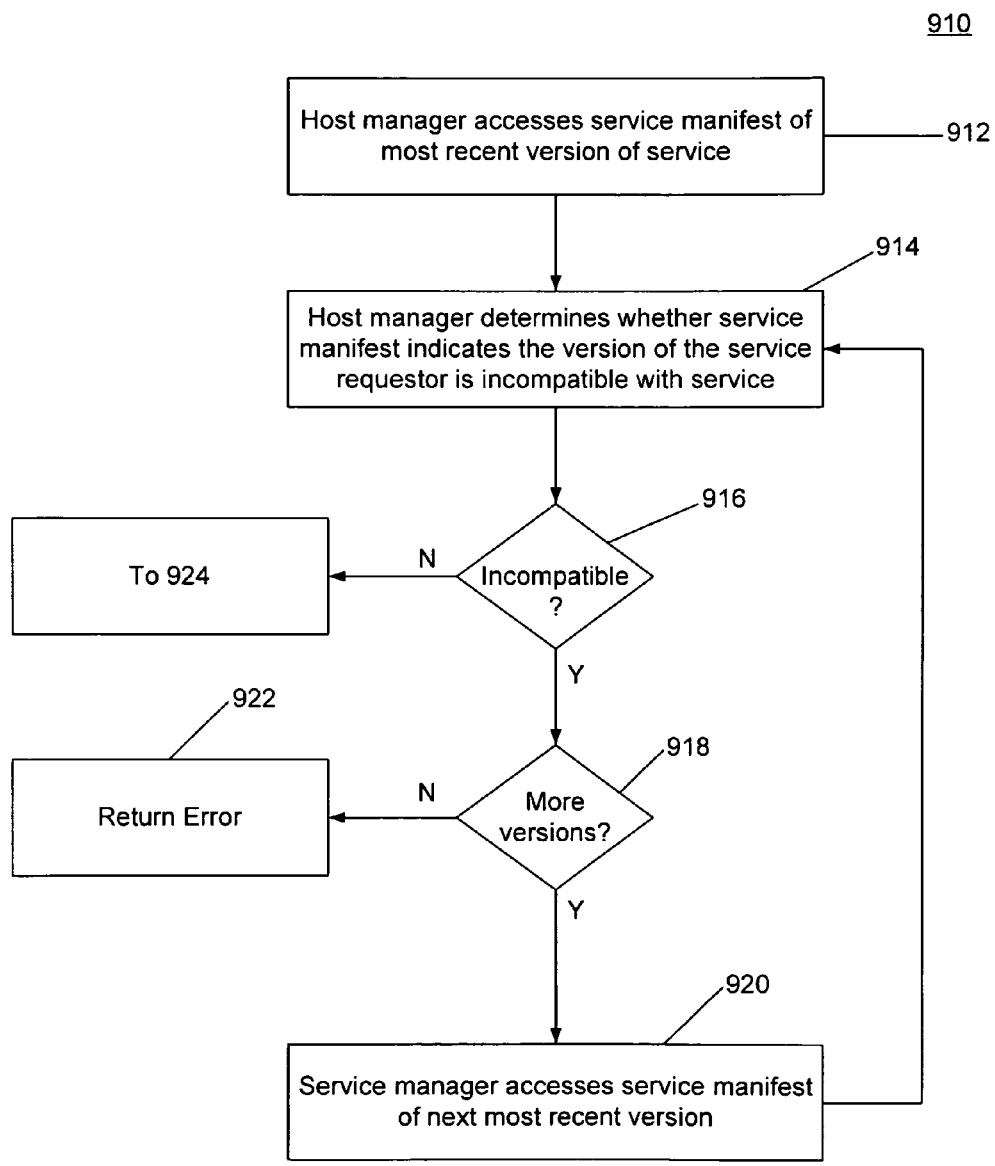
Figure 9C:
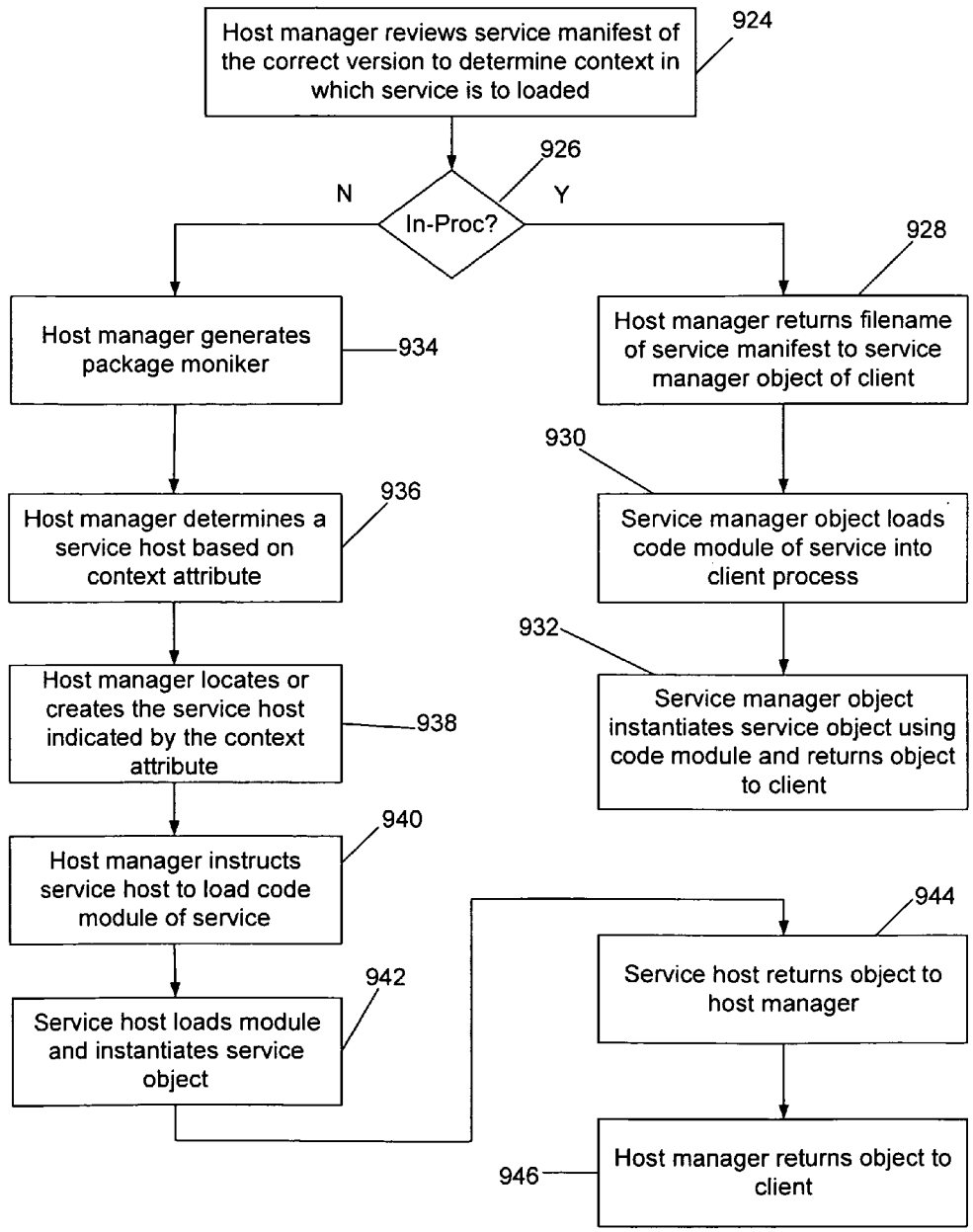

FIGS. 9A-9C show an example of a process 900 implemented by the runtime architecture 400 for service versioning and grouping. Referring specifically to FIG. 9A, when the client 402 wants to request a service object, client 402 creates an in-process service manager object using the code from the SvcMgr.dll 408a loaded into the client 402 (902). The client 402 then passes the class moniker for the service object to the service manager object (904). The service manager object then passes the class moniker and a client moniker of the client to the host manager process 408b (906). The host manager process 408b, through a service manager object created using the code from the SvcMgr.dll 408b loaded in host manager 404, searches the service manifests to locate the service manifests for the different versions of the service (908), and then reviews those service manifests to identify the correct version of the service for the client 402 (910). For example, if the service manifests are in an XML format, host manager 404 may have cached versions of the Document Object Models (DOMs) of the service manifests, which the host manager 404 uses to identify the correct version of the requested service.

Referring to FIG. 9B, to identify the correct version of the service for use with the client 402, after the host manager 404 has located the service manifests for the different versions of the service, the host manager accesses the service manifest of the most recent version of the service (912). The host manager 404 then inspects the service manifest to determine whether the manifest indicates that the service is incompatible with the client version (914). If a <clientFilter> tag and/or an <override> tag indicates that the client 402 (identified by its client moniker) is not permitted to use that version of the service (916), and there are more versions of the service (918), then the host manager 404 accesses the service manifest of the next most recent version of the service (920) to determine if the client 402 is permitted to use that version of the service (914). If not (916), then the host manager 404 continues to progressively inspect the service manifests of earlier versions until the host manager 404 discovers a version that the client 402 is permitted to use, or until there are no more versions left to review (914-920). If there are no more versions of the service (918), and the host manager 404 has not identified one that is compatible with the client, then the host manager 404 returns an error to the client 402 (922).

Referring to FIG. 9C, once the host manager 404 has identified the correct version of the service (916), the host manager 404 reviews the corresponding service manifest to determine the context in which to load the code module (924). To do so, the host manager 404 reviews the service manifest to locate the requested class in the manifest. The host manager 404 then inspects the context attribute of the <module> tag enclosing the <class> tag that contains the name of the corresponding class. If the context attribute indicates that code module is to be loaded in-process (926), the host manager returns the filename of the appropriate service manifest to the service manager object created by client 402 (928). The service manager object created by the client 402 is then responsible for accessing the manifest file, determining the appropriate code module from the file attribute of the <module> tag, loading the code module into the client's address space (930), instantiating a service object of the requested class, and returning a reference to the object to the client 402 (932).

On the other hand, if the context attribute indicates that the code module is to be loaded out-of-process (926), the host manager 404 forms a package moniker from the service attributes and the version attribute of the <package> tag in the service manifest (934). The host manager 404 then uses the context attribute to determine the service host into which the code module is to be loaded (936). If the context attribute is set to a string value other than "defaultGrp," the host manager 404 looks for a service host with a name equal to the string value. If one is not executing, the host manager 404 creates a service host with a name equal to the string value to start executing. Similarly, if the context attribute is set to "defaultGrp," or there is no context attribute at all, the host manager 404 looks for a service host with the default name and, if one is not executing, the host manager 404 creates one with the default name.

If an executing service host with the appropriate name is found, or after the host manager 404 causes one to start executing (938), the host manager 404 sends a request to the service host (e.g., service host 406a) to load the code module for the service, and create a service object of the requested class (940). The request to the service host 406a includes the file name of the code module that must be loaded, the package name, and the class to be instantiated. The service host 406a then uses a service manager object created (e.g., from the service manager DLL 408c loaded into service host 406a) to load the code module into its address space and instantiate a service object of the requested class (942). The service manager object then returns a reference to the service object to the host manager 404 (944), which returns the reference to the client 402 through the service manager object created by client 402 (946).

Service Cleanup

The execution environment runtime 204b, through the service manager subsystem, may provide for service clean-up. In general, the service manager subsystem determines and removes versions of services or application services that are no longer reachable by other services or applications. To perform service clean-up, the service manager subsystem inspects the service manifests for a service to determine the newest version of the service that does not block any clients from using it.

Figure 10:
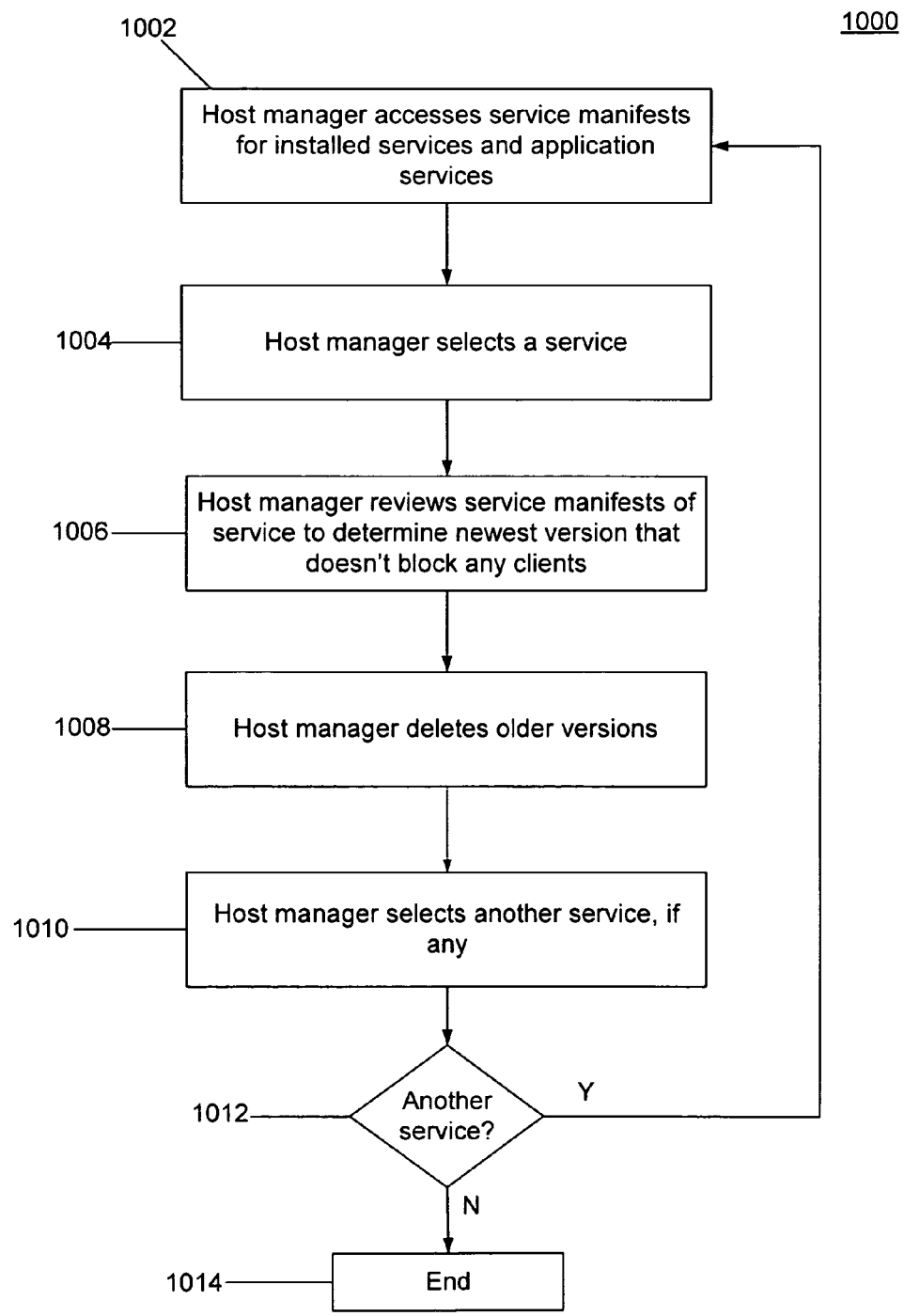
FIG. 10 is a flowchart showing an example of a process implemented by the runtime architecture of FIG. 4 for service clean-up.

FIG. 10 shows an example of a process 1000 implemented by the runtime architecture 400 for service clean-up. The host manager 404, upon startup, loads the service manager DLL 408b and creates a service manager object. Using the service manager object, the host manager 404 then performs service clean-up.

In general, to perform service clean-up, the host manager 404, through the service manager object, accesses the service manifests for installed services and application services (1002). For example, if the service manifests are implemented in XML, then host manager 406 may load and parse the service manifests, and then cache the DOMs of the service manifests. The host manager 404 then selects a service (1004) and proceeds to review the service manifests of the different versions of the service, from the newest to the oldest to determine the newest version of the service that does not block any clients (1006). The host manager 404 then deletes all versions of the service that are older than the newest version that does not block any clients (1008). Once the host manager 404 determines the newest version of the service that doesn't block any clients, or reviews all of the version of the service, host manager 404 selects another service to review, if there are any left (1010). If so 1012), then host manager repeats the process on the new service. If there are no services left to review (1012), process 1000 ends (1014).

Specifically, the host manager 404 identifies the newest version of the service and inspects the service manifest of that version to determine if the service manifest blocks any clients from using the service. The host manager 404 may, for instance, inspect any <clientFilter> and <override> tags located in the service manifest to determine if any clients are blocked. If there are no blocked clients, the service manager deletes the earlier versions of the service.

If any clients are blocked, the host manager 404 then determines if there are any earlier versions of the service or application service. If there are not any earlier versions of the service, then the host manager 404 selects another service, or the host manager 404 ends the review if there are no more services to review.

If there are earlier versions of the service, the host manager 404 then identifies the next newest version of the service, and inspects the service manifest of that version to determine if the service manifest blocks any clients from using the service. If there are no blocked clients, the service manager deletes earlier versions of the service. If there are blocked clients, then this process continues until there are no more versions to review, in which case, no versions are deleted.

Once the host manager 404 completes the review of a service, the host manager 404 selects another service, if there are any left that have not been previously reviewed by the host manager 404 for clean-up. The process then reviews the versions of the newly selected service. Otherwise, the host manager 404 ends the review of the services.

Service Discovery

The execution environment runtime 204b, through the service manager subsystem, may provide for service discovery, in which a client can request identification of services meeting particular criteria. As described above, service manifest files describe the properties and capabilities, and other information about the services or application services. A client may send a search query to the service manager subsystem. The search query specifies particular criteria. The service manager subsystem then searches the service manifests of the installed services or application services to determine which service manifest files contain meta-data meeting the specified criteria. The service manager subsystem then returns an identification of the services or application services that have manifest files that contain the specified metadata, and may return the specified meta-data. The client can then use one of the returned services, or use the returned meta-data. The service manager subsystem also may limit the service manifests searched to those corresponding to the newest versions of the services that are compatible with the client.

In implementations in which the service manifests are implemented in XML, the clients may be able to submit queries for particular tags, or particular tags with particular attribute values. The service manager then searches for those tags in the service manifests, and returns an identifier of the matching services and the matching tags.

Figure 11:
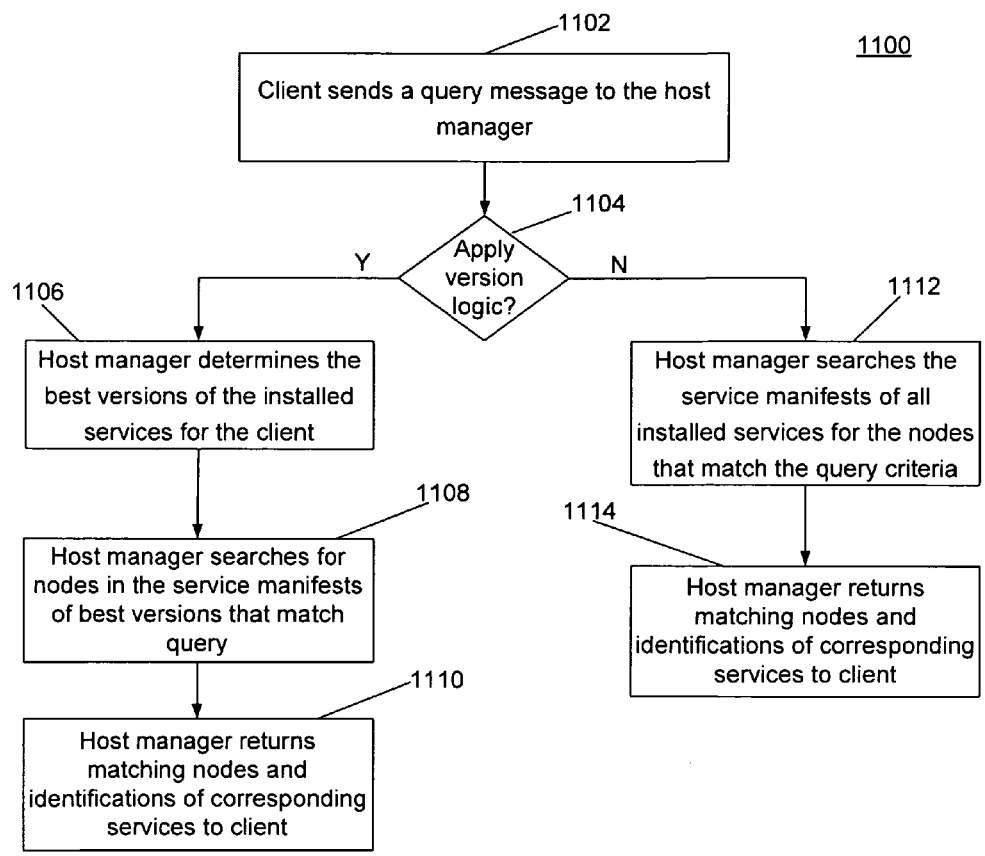
FIG. 11 is a flowchart showing an example of a process implemented by the runtime architecture for service discovery when the service manifest files are implemented in XML.

FIG. 11, shows is an example of a process 1100 implemented by the runtime architecture 400 for service discovery when the service manifest files are implemented in XML. In such an implementation, host manager 404, through a service manager object, may parse the service manifests to generate their DOMs, and cache the DOMs. In such a situation, queries are performed against the nodes of the DOM, and nodes of the DOM may be returned in addition to the identification of the matching services.

When the client 402 wants to search for services matching particular criteria, client 402, through a service manager object, sends a query message to the host manager 404 (1102). The query message contains a query, a best version parameter, and a client moniker.

The query designates the matching criteria for nodes and attributes. The query may be expressed in a query language that is a subset of the XML Path Language (XPATH), which may allow for arbitrary queries of the tags/nodes in the service manifests. XPATH is a language for addressing parts of an XML document. An example of a subset of XPATH that may be used is as follows (expressed in Backus-Naur Form (BNF)):

| [1] LocationPath | ::= | AbsoluteLocationPath |
| --- | --- | --- |
|  | \| | RelativeLocationPath |
| [2] AbsoluteLocationPath | ::= | '/' RelativeLocationPath |
| [3] RelativeLocationPath | ::= | Step |
|  | \| | RelativeLocationPath '/' Step |
| [4] Step | ::= | NameTest PredicateOption |
| [5] PredicateOption | ::= | Empty |
|  | \| | Predicate |
| [6] Predicate | ::= | '[' PredicateExpr ']' |
| [7] PredicateExpr | ::= | Expr |

-continued

| | | |
|---|---|---|
| [8] Expr | ::= | OrExpr |
| [9] OrExpr | ::= | AndExpr |
| | \| | OrExpr 'or' AndExpr |
| [10] AndExpr | ::= | EqualityExpr |
| | \| | AndExpr 'and' EqualityExpr |
| [11] EqualityExpr | ::= | PrimaryExpr |
| | \| | AttributeName '=' StringLiteral |
| | \| | AttributeName '!=' StringLiteral |
| [12] PrimaryExpr | ::= | '(' Expr ')' |
| | \| | AttributeName |
| [13] AttributeName | ::= | '@' NodeName |
| [14] NameTest | ::= | '*' |
| | \| | NodeName |

The following are examples of queries that may be performed using this subset of XPATH:

```
/package
Query for all the nodes that have package as the root node
/package[@service="helloworldservice"]
Query for all nodes that have package as the root node and a service
attribute with a value of "helloworldservice"
/package[[@service="helloworldservice" and
@version='2.1.0']/modules/module
Query for all nodes that have package as a root with a service
attribute that has a value of "helloworldservice" and version attribute with
a value of '2.1.
```

The best version parameter designates whether version logic should be applied. If the best version parameter indicates version logic should be applied, then only the best version of a given service (the newest version that is compatible with the client) will be considered for the query. The client moniker is used to determine the best version of a given service. If the best version parameter indicates that version logic should not be applied, then all versions of a given service will be queried for a match.

Accordingly, when the host manager 404 receives the query request, the host manager, through a service manager object, determines whether the best version parameter indicates that version logic should be applied and, if so (1104), determines the best versions of the installed services for the client using, for example, process 910 (1106). Based on the criteria specified in the query, the host manager 404 then searches the DOMs of the service manifests of the best versions of the installed services or application services for the nodes that match the query criteria (1108). The host manager 404 then returns the matching nodes and the identifications of the corresponding services (e.g., a package moniker) to the client through the service manager object of the client (1110).

If the best version parameter indicates that version logic should not be applied (1104), the host manager 404 searches the service manifests of all installed services or application services for the nodes that match the query criteria (1112). The host manager 404 then returns the matching nodes and an identification of the corresponding service (e.g., a package moniker) to the client through the service manager object of the client (1114).

Using the service discovery mechanism, clients can determine whether services having certain properties or capabilities are installed, and then use those services or the meta-data describing the properties or capabilities. For example, clients can determine whether a particular version of a service is installed, and then use that version of the service.

As another example, service discovery may allow a preferences manager application to discover which application services have default preferences, and what those default preferences are. The preferences manager may manage preferences for multiple applications. To do so, the preferences manager may query which application services have default preferences (e.g., by submitting a query for service manifests that contain an <app> tag and <preferenceDefault> tags). When the default preferences tags are returned, along with an identification of the services, the preferences manager may then display the default preferences for the multiple applications to the user, and allow the user to change the default preferences.

As another example, a navigation bar application may display a navigation bar that contains different buttons for launching different applications. To determine the application services that can be launched from the navigation bar, and the resource that defines their buttons, the navigation bar application may search for service manifests that contain a <navbar> tag. The <navbar> tag may have an attribute that indicates where the resource defining the application service's button is located. The navigation bar application uses the location to review the resource and implement a button on the navigation bar according to the resource. The navigation bar application also associates the application service identifier with the button so that the application service can be launched if the button is selected.

In general, implementing the service manifests in XML, and using a query language such as XPATH, allows for arbitrary queries to be performed on the meta-data in the service manifest files. This provides extensibility to the service discovery mechanism, by allowing developers to add new tags to describe additional information regarding a service, while having a mechanism for searching for the new tags.

Execution Environment API and Objects

As described above, the execution environment library provides the APIs for developing objects exposed by the execution environment runtime 204b, and applications and services that call those objects. The APIs are an abstraction of the platform specific APIs for developing and calling objects native to the platform. In general, many operating system platforms have a native object model (i.e., a model for objects that are natively supported by the operating system). In other words, many operating systems include code that directly supports a particular object model. For example, a Windows operating system natively supports Component Object Model (COM) objects, while a Macintosh operating system natively supports Distributed Objects. Normally, a set of APIs is available for accessing the native objects of a particular operating system platform.

However, the APIs of the execution environment library provide an abstraction layer above the platform specific APIs, which allows a developer to develop objects without regard to the platform on which the objects will run. Accordingly, the APIs of the execution environment library are operating system neutral APIs. The underlying implementation for a given operating system platform, however, uses the platform specific APIs and code. Thus, when objects developed using the execution environment library are compiled for a specific operating system platform, they are compiled as native objects. For instance, when compiled for a Windows operating system, the objects are COM objects, but are Distributed Objects when compiled for a Macintosh operating system. Therefore, these objects are accessible using the APIs for the natively supported objects.

However, even though the objects are compiled to native objects, they are still accessible by the operating system neutral APIs. To accomplish this, the execution environment library includes a platform-neutral interop in compiled objects.

Figure 12:
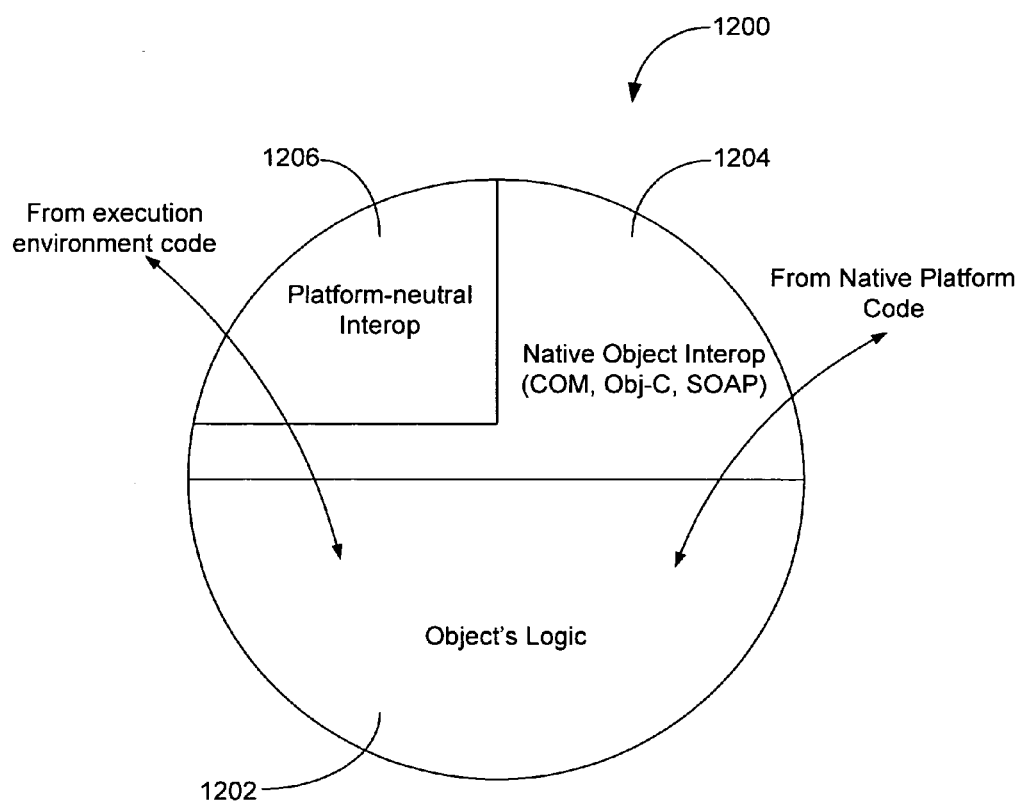
FIG. 12 is a diagram showing a compiled object.

Thus, referring to FIG. 12, a compiled object 1200 developed using the execution environment library includes the object's logic code 1202. On top of the object's logic code 1202 is a native object interop 1204 that allows the object's logic code to be accessed using the APIs for accessing native objects of the operating system. On top of the native object interop is a platform-neutral interop 1206 that allows the object's logic code 1202 to be accessed by the platform-neutral APIs. To allow the object's logic to be accessed, the platform neutral interop 1206 translates between the API calls from the platform neutral APIs to the APIs used for accessing the native objects.

Figure 13:
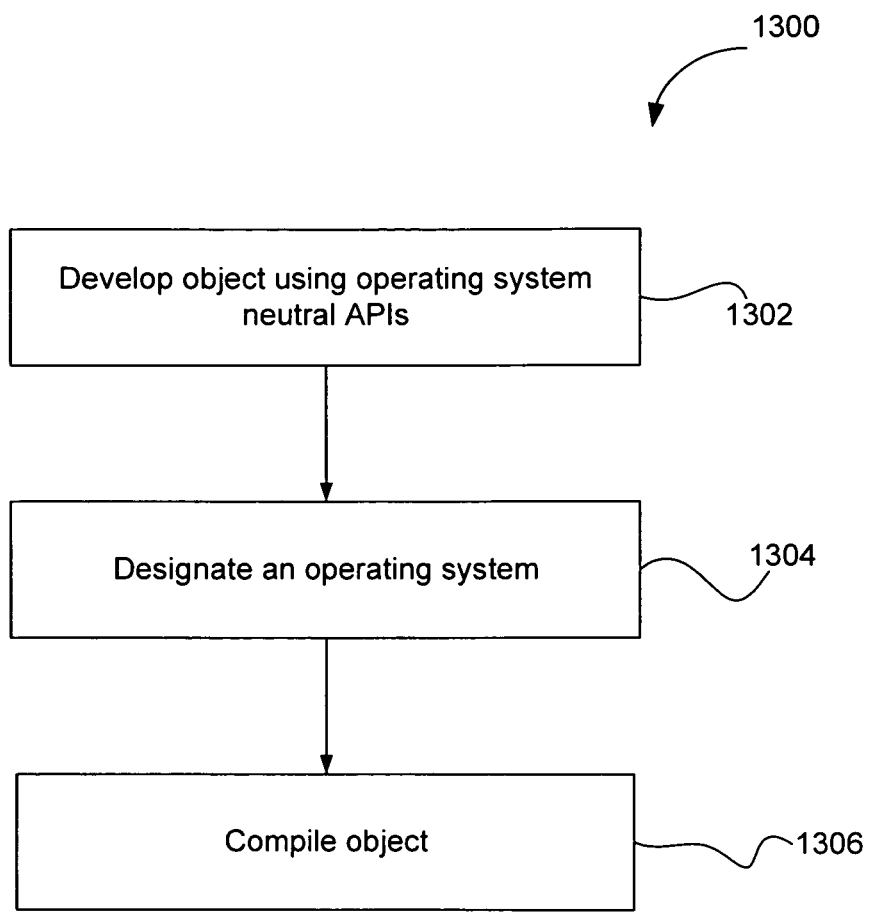
FIG. 13 is a process for creating an object such as the one shown in FIG. 12.

Referring to FIG. 13, a process 1300 for creating an object such as object 1200 includes developing the object using the operating system neutral API of the execution environment library (1302) and designating an operating system for which the object is to be compiled (1304). The operating system includes native objects and APIs for accessing the native objects of the operating system. The process also includes compiling the object for the designated operating system to generate a compiled object (1306). The compiled object includes logic code; a native object interop for accessing the logic code using the APIs for accessing native objects of the operating system; and a platform-neutral interop for accessing the logic code using the operating system neutral API.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be. Accordingly, other implementations are within the scope of the following claims.

What is claimed is:

1. A method for removing versions of a service not reachable by a set of service requestors that use the service, the method comprising the following operations performed by at least one processor:
    storing multiple, different versions of a service;
    storing, for each of the multiple different versions of the service, a metadata file, each metadata file including metadata that indicates which versions of service requestors among the set of service requestors are compatible with the associated version of the service, the metadata files including one or more tags that indicate a default condition in which all versions of service requestors among the set of service requestors are compatible with the associated version of the service;
    examining the metadata file associated with a new version of the service to determine whether the metadata file includes one or more tags that override the default condition by indicating a range of versions of specific ones of service requestors among the set of service requestors that are blocked from using the new version of the service;
    deleting, when it is determined that no version of a service requestor is blocked from using the new version of the service, one or more versions of the service previous to the new version;
    examining, when it is determined that a version of a service requestor is included in the range of versions blocked from using the new version of the service, a second metadata file associated with a version of the service previous to the new version to determine whether the second metadata file includes one or more tags that override the default condition by indicating a range of versions of specific ones of service requestors among the set of service requestors that are blocked from using the previous version of the service; and
    deleting, when it is determined that no version of a service requestor is blocked from using the previous version of the service, one or more versions of the service previous to the previous version.

2. The method of claim 1, wherein the metadata files are XML documents.

3. The method of claim 1, wherein the metadata that indicates which ones of the set of service requestors are compatible with the associated version of the service includes:
    one or more tags that indicate an alternate default condition in which none of the service requestors in the set of service requestors are compatible with the associated version of the service; and
    one or more tags that override the default condition by indicating specific ones of the services requestors in the set of service requestors that are compatible with the associated version of the service.

4. The method of claim 1 wherein the service comprises any one of: an instant messaging (IM) service; a mail service; a common local storage service; a notification manager; a preferences service; or a sequencer service.

5. The method of claim 1, wherein the metadata associated with the new version of the service indicates the range of versions of specific ones of service requestors among the set of service requestors that are blocked from using the new version of the service by specifying a version of a service requestor as an upper limit of the range and a different version of the service requestor a lower limit of the range.

6. The method of claim 5, wherein the upper limit and lower limit are included in the range of versions blocked from using the new version of the service.

7. The method of claim 5, wherein the upper limit and lower limit are not included in the range of versions blocked from using the new version of the service.

8. A system, comprising:
    a memory device storing:
        multiple, different versions of a service;
        a set of service requestors that use the service;
        metadata files, for each of the multiple different version of the service, each metadata file including metadata that indicates which versions of service requestors among the set of service requestors are compatible with the associated version of the service, the metadata files including one or more tags that indicate a default condition in which all versions of service requestors among the set of service requestors are compatible with the associated version of the service;
    and a server storing a service manager subsystem that:
        examines the metadata file associated with a new version of the service to determine whether the metadata file includes one or more tags that override the default condition by indicating a range of versions of specific ones of service requestors among the set of service requestors that are blocked from using the new version of the service;

deletes, when it is determined that no version of a service requestor is included in the range of versions blocked from using the new version of the service, one or more versions of the service previous to the new version;

examine, when it is determined that a version of a service requestor is blocked from using the new version of the service, a second metadata file associated with a version of the service previous to the new version to determine whether the second metadata file includes one or more tags that override the default condition by indicating a range of versions of specific ones of service requestors among the set of service requestors that are blocked from using the previous version of the service; and delete, when it is determined that no version of a service requestor is blocked from using the previous version of the service, one or more versions of the service previous to the previous version.

9. The system of claim 8, wherein the metadata files are XML documents.

10. The system of claim 8, wherein the metadata that indicates which ones of the set of service requestors are compatible with the associated version of the service includes:

one or more tags that indicate an alternate default condition in which none of the service requestors in the set of service requestors are compatible with the associated version of the service; and one or more tags that override the default condition by indicating specific ones of the services requestors in the set of service requestors that are compatible with the associated version of the service.

11. The system of claim 8 wherein the service comprises any one of: an instant messaging (IM) service; a mail service; a common local storage service; a notification manager; a preferences service; or a sequencer service.

12. A non-transitory computer readable storage medium usable by a computing device, the medium having code embodied thereon for removing versions of a service not reachable by a set of service requestors that use the service, the code comprising instructions for causing the computing device to perform the following operations:

store multiple, different versions of a service;

store, for each of the multiple different versions of the service, metadata files, each metadata file including metadata that indicates which versions of service requestors among the set of service requestors are compatible with the associated version of the service, the metadata files including one or more tags that indicate a default condition in which all versions of service requestors among the set of service requestors are compatible with the associated version of the service;

examine the metadata file associated with a new version of the service to determine whether the metadata file includes one or more tags that override the default condition by indicating a range of versions of specific ones of service requestors among the set of service requestors that are blocked from using the new version of the service;

delete, when it is determined that no version of a service requestor is blocked from using the new version of the service, one or more versions of the service previous to the new version;

examine, when it is determined that a version of a service requestor is included in the range of versions blocked from using the new version of the service, a second metadata file associated with a version of the service previous to the new version to determine whether the second metadata file includes one or more tags that override the default condition by indicating a range of versions of specific ones of service requestors among the set of service requestors that are blocked from using the previous version of the service; and delete, when it is determined that no version of a service requestor is blocked from using the previous version of the service, one or more versions of the service previous to the previous version.

13. The medium of claim 12, wherein the metadata files are XML documents.

14. The medium of claim 12, wherein the metadata that indicates which ones of the set of service requestors are compatible with the associated version of the service includes:

one or more tags that indicate an alternate default condition in which none of the service requestors in the set of service requestors are compatible with the associated version of the service; and one or more tags that override the default condition by indicating specific ones of the services requestors in the set of service requestors that are compatible with the associated version of the service.

15. The medium of claim 12 wherein the service comprises any one of: an instant messaging (IM) service; a mail service; a common local storage service; a notification manager; a preferences service; or a sequencer service.

* * * * *